United States Patent
Srinivasan et al.

(10) Patent No.: US 8,972,995 B2
(45) Date of Patent: *Mar. 3, 2015

(54) APPARATUS AND METHODS TO CONCURRENTLY PERFORM PER-THREAD AS WELL AS PER-TAG MEMORY ACCESS SCHEDULING WITHIN A THREAD AND ACROSS TWO OR MORE THREADS

(75) Inventors: Krishnan Srinivasan, San Jose, CA (US); Ruben Khazhakyan, Yerevan (AM); Harutyan Aslanyan, Yerevan (AM); Drew E. Wingard, Palo Alto, CA (US); Chien-Chun Chou, Saratoga, CA (US)

(73) Assignee: Sonics, Inc., Milpitas, CA (US)

( * ) Notice: Subject to any disclaimer, the term of this patent is extended or adjusted under 35 U.S.C. 154(b) by 528 days.

This patent is subject to a terminal disclaimer.

(21) Appl. No.: 12/852,355

(22) Filed: Aug. 6, 2010

(65) Prior Publication Data

US 2012/0036509 A1    Feb. 9, 2012

(51) Int. Cl.
*G06F 9/46*    (2006.01)
*G06F 13/00*    (2006.01)
*G06F 13/28*    (2006.01)
(Continued)

(52) U.S. Cl.
CPC ..................................... *G06F 9/526* (2013.01)
USPC ........... 718/100; 718/101; 718/102; 718/103; 718/104; 711/151; 711/152; 712/28; 712/29; 712/30; 712/31; 712/32; 712/34

(58) Field of Classification Search
USPC .......... 718/100, 101, 102, 103, 104; 711/151, 711/152
See application file for complete search history.

(56) References Cited

U.S. PATENT DOCUMENTS 5,708,659 A    1/1998 Rostoker et al.
5,781,918 A    7/1998 Lieberman et al.
(Continued)

FOREIGN PATENT DOCUMENTS

EP    2156305    2/2010
JP    2006-277404    10/2006
(Continued)

OTHER PUBLICATIONS

International Search Report and Written Opinion for International Patent Application No. PCT/US2011/042513 file date Jun. 30, 2011, mail date Nov. 10, 2011, 11 pages.
(Continued)

*Primary Examiner* — Charles Swift
(74) *Attorney, Agent, or Firm* — Rutan & Tucker, LLP

(57) ABSTRACT

A method, apparatus, and system in which an integrated circuit comprises an initiator Intellectual Property (IP) core, a target IP core, an interconnect, and a tag and thread logic. The target IP core may include a memory coupled to the initiator IP core. Additionally, the interconnect can allow the integrated circuit to communicate transactions between one or more initiator Intellectual Property (IP) cores and one or more target IP cores coupled to the interconnect. A tag and thread logic can be configured to concurrently perform per-thread and per-tag memory access scheduling within a thread and across multiple threads such that the tag and thread logic manages tags and threads to allow for per-tag and per-thread scheduling of memory accesses requests from the initiator IP core out of order from an initial issue order of the memory accesses requests from the initiator IP core.

19 Claims, 10 Drawing Sheets

(51) Int. Cl.
*G06F 9/26* (2006.01)
*G06F 9/34* (2006.01)
*G06F 15/00* (2006.01)
*G06F 15/76* (2006.01)
*G06F 9/52* (2006.01)

(56) References Cited

U.S. PATENT DOCUMENTS

| | | |
|---|---|---|
| 5,948,089 A | 9/1999 | Wingard et al. |
| 5,999,435 A | 12/1999 | Henderson et al. |
| 6,088,788 A | 7/2000 | Borkenhagen et al. |
| 6,092,115 A | 7/2000 | Choudhury et al. |
| 6,182,183 B1 | 1/2001 | Wingard et al. |
| 6,249,144 B1 | 6/2001 | Agrawal et al. |
| 6,330,225 B1 | 12/2001 | Weber et al. |
| 6,331,961 B1 | 12/2001 | Kengeri et al. |
| 6,393,500 B1 | 5/2002 | Thekkath |
| 6,466,825 B1 | 10/2002 | Wang et al. |
| 6,487,621 B1 | 11/2002 | MacLaren |
| 6,505,260 B2 | 1/2003 | Chin et al. |
| RE37,980 E | 2/2003 | Elkhoury et al. |
| 6,526,462 B1 | 2/2003 | Elabd |
| 6,578,117 B2 | 6/2003 | Weber |
| 6,597,629 B1 | 7/2003 | Raszka et al. |
| 6,606,317 B1 | 8/2003 | Beadle et al. |
| 6,651,082 B1 | 11/2003 | Kawase et al. |
| 6,662,251 B2 | 12/2003 | Brock et al. |
| 6,683,474 B2 | 1/2004 | Ebert et al. |
| 6,725,313 B1 | 4/2004 | Wingard et al. |
| 6,779,089 B2 | 8/2004 | Lin et al. |
| 6,785,753 B2 | 8/2004 | Weber et al. |
| 6,804,738 B2 | 10/2004 | Weber |
| 6,804,757 B2 | 10/2004 | Weber |
| 6,804,815 B1 | 10/2004 | Kerr et al. |
| 6,810,470 B1 | 10/2004 | Wiseman et al. |
| 6,874,039 B2 | 3/2005 | Ganapathy et al. |
| 6,877,076 B1 | 4/2005 | Cho et al. |
| 6,961,834 B2 | 11/2005 | Weber |
| 6,976,106 B2 | 12/2005 | Tomlinson et al. |
| 6,988,186 B2 | 1/2006 | Eickemeyer et al. |
| 7,003,628 B1 | 2/2006 | Wiedenman et al. |
| 7,046,686 B2 | 5/2006 | Tompkins et al. |
| 7,116,131 B1 | 10/2006 | Chirania et al. |
| 7,120,712 B2 | 10/2006 | Wingard et al. |
| 7,120,765 B2 | 10/2006 | Dodd et al. |
| 7,149,829 B2 | 12/2006 | Weber et al. |
| 7,155,554 B2 | 12/2006 | Vinogradov et al. |
| 7,165,094 B2 | 1/2007 | Weber et al. |
| 7,191,273 B2 | 3/2007 | Weber |
| 7,194,561 B2 | 3/2007 | Weber |
| 7,325,221 B1 | 1/2008 | Wingard et al. |
| 7,543,088 B2 | 6/2009 | Weber et al. |
| 7,543,093 B2 | 6/2009 | Chou et al. |
| 7,552,292 B2 | 6/2009 | Hsieh et al. |
| 7,574,629 B2 | 8/2009 | Douady et al. |
| 7,587,535 B2 | 9/2009 | Sawai |
| 7,598,726 B1 | 10/2009 | Tabatabaei |
| 7,814,243 B2 | 10/2010 | Hamilton |
| 7,852,343 B2 | 12/2010 | Tanaka et al. |
| 7,899,953 B2 | 3/2011 | Inoue |
| 8,166,214 B2 | 4/2012 | Hamilton |
| 2002/0083256 A1 | 6/2002 | Pannell |
| 2002/0129173 A1 | 9/2002 | Weber et al. |
| 2002/0129210 A1 | 9/2002 | Arimilli et al. |
| 2003/0004699 A1 | 1/2003 | Choi et al. |
| 2003/0023794 A1 | 1/2003 | Venkitakrishnan et al. |
| 2003/0074520 A1 | 4/2003 | Weber |
| 2003/0088721 A1 | 5/2003 | Sharma |
| 2003/0140196 A1 | 7/2003 | Wolrich et al. |
| 2003/0208611 A1 | 11/2003 | Weber et al. |
| 2004/0010652 A1 | 1/2004 | Adams et al. |
| 2004/0068603 A1 | 4/2004 | Augsburg et al. |
| 2004/0139284 A1* | 7/2004 | Clayton et al. ............ 711/147 |
| 2004/0177186 A1 | 9/2004 | Wingard et al. |
| 2004/0210696 A1 | 10/2004 | Meyer et al. |
| 2005/0086412 A1 | 4/2005 | Douady et al. |
| 2005/0117589 A1 | 6/2005 | Douady et al. |
| 2005/0138252 A1* | 6/2005 | Gwilt ............................ 710/110 |
| 2005/0157717 A1 | 7/2005 | Douady et al. |
| 2005/0210164 A1 | 9/2005 | Weber et al. |
| 2005/0210325 A1 | 9/2005 | Douady et al. |
| 2006/0004956 A1 | 1/2006 | Madajczak |
| 2006/0047890 A1 | 3/2006 | Van De Waerdt |
| 2006/0195663 A1 | 8/2006 | Arndt et al. |
| 2006/0218315 A1 | 9/2006 | Okajima et al. |
| 2007/0038791 A1 | 2/2007 | Subramanian et al. |
| 2007/0067549 A1* | 3/2007 | Gehman ....................... 710/315 |
| 2007/0094429 A1 | 4/2007 | Wingard et al. |
| 2007/0110052 A1 | 5/2007 | Kok et al. |
| 2007/0124728 A1 | 5/2007 | Rosenbluth et al. |
| 2007/0162268 A1 | 7/2007 | Kota et al. |
| 2007/0220517 A1* | 9/2007 | Lippett ......................... 718/102 |
| 2008/0005713 A1 | 1/2008 | Singh et al. |
| 2008/0028090 A1 | 1/2008 | Kok et al. |
| 2008/0059765 A1* | 3/2008 | Svendsen et al. ............... 712/34 |
| 2008/0059771 A1* | 3/2008 | Svendsen et al. ............. 712/218 |
| 2008/0082794 A1* | 4/2008 | Yu et al. ........................ 712/218 |
| 2008/0086577 A1 | 4/2008 | Huang |
| 2008/0114937 A1* | 5/2008 | Reid et al. ..................... 711/117 |
| 2008/0133489 A1 | 6/2008 | Armstead et al. |
| 2008/0183926 A1 | 7/2008 | Wingard et al. |
| 2008/0235421 A1 | 9/2008 | Jayaratnam et al. |
| 2008/0301256 A1* | 12/2008 | McWilliams et al. ........ 709/214 |
| 2008/0301708 A1* | 12/2008 | Hamilton ...................... 719/314 |
| 2008/0320254 A1 | 12/2008 | Wingard et al. |
| 2008/0320255 A1* | 12/2008 | Wingard et al. ............... 711/157 |
| 2008/0320268 A1* | 12/2008 | Wingard et al. ............... 711/202 |
| 2008/0320476 A1* | 12/2008 | Wingard et al. ............... 718/101 |
| 2009/0044189 A1* | 2/2009 | Mutlu et al. ................... 718/102 |
| 2009/0138670 A1* | 5/2009 | Mutlu et al. ................... 711/167 |
| 2009/0235020 A1 | 9/2009 | Srinivasan et al. |
| 2010/0023664 A1* | 1/2010 | Chang .......................... 710/112 |
| 2010/0042759 A1* | 2/2010 | Srinivasan et al. .............. 710/35 |
| 2010/0057400 A1* | 3/2010 | Chou et al. ................... 702/182 |
| 2010/0095036 A1* | 4/2010 | Mittal et al. .................. 710/117 |
| 2010/0115196 A1* | 5/2010 | Hamilton ..................... 711/108 |
| 2010/0155493 A1* | 6/2010 | Russell et al. ................ 235/492 |
| 2010/0333098 A1* | 12/2010 | Jordan et al. ................. 718/103 |
| 2011/0213949 A1* | 9/2011 | Jayasimha et al. ............ 712/29 |
| 2012/0036296 A1 | 2/2012 | Wingard et al. |

FOREIGN PATENT DOCUMENTS

| | | |
|---|---|---|
| KR | 10-2009-7026779 | 5/2008 |
| WO | WO09/002998 | 12/2008 |
| WO | WO 2008/148132 | 12/2008 |
| WO | WO 2011/109305 A1 | 9/2011 |
| WO | WO 2012/018465 A1 | 2/2012 |

OTHER PUBLICATIONS

Wingard, Drew (Sonics, Inc.) "Sonics SOC Integration Architecture," P1500 Presentation, Jan. 28, 1999, pp. 1-25.
Weber, Wolf-Dietrich, "Efficient Shared DRAM Subsystems for SOC's," Systems on IC's www.sonicsinc.com, Copyright 2001, Sonics, Inc. pp. 1-6.
OCP International Partnership, "Open Core Protocol Specification," Release 1.0 OCP-IP Confidential, Document Revision 1.1.1, Copyright 2001, 184 pages total.
Kamas, Alan, "An Overview of the SystemC Models for the Open Core Protocol", The SystemC OCP Models, 2004, pp. 1-30.
Haverinen, Anssi, et al., White Paper for SystemC (tm) based SoC Communication Modeling for the OCP (tm) Protocol, V1.0, Oct. 14, 2002, pp. 1-39.
Akesson, Benny, et al. "Predator: A Predictable SDRAM Memory Controller", Codes+ISSS'07, Sep. 30-Oct. 3, 2007, 6 pages.
Mutlu, Onur, et al., "Stall-Time Fair Memory Access Scheduling for Chip Multiprocessors", 40th Annual IEEE/ACM International Symposium (MICRO), Dec. 2007, 14 pages.
Ryu, Keong Keol, et al., "A Comparison of Five Different Multiprocessor SoC Bus Architectures", 8 pages plus 2 pages of IEEE Biblio data. 2001 ISBN 0-7695-1239-9. Digital Systems Design, 2001 ; Proceedings, Euromiero Symposium, Warsaw, Poland.

(56) References Cited

OTHER PUBLICATIONS

Intel Dual-Channel DDR Memory Architecture White Paper informational brochure, Infineon Technologies North America Corporation and Kingston Technology Company, Inc., 14 pages, Sep. 2003.
Ahn, Jung Ho et al, The Design Space of Data-Parallel Memory Systems, IEEE, 12 pages, Nov. 2006.
International Preliminary Report on Patentability for International Patent Application No. PCT/US2011/42513 mailed Feb. 21, 2013, 10 pages. The International Bureau of WIPO, Geneva, Switzerland.
Non-Final Office Action for U.S. Appl. No. 12/714,810 mailed Aug. 5, 2014, 17 pages. U.S. Patent and Trademark Office, Alexandria VA US.
Advisory Action for U.S. Appl. No. 12/714,810 mailed Feb. 12, 2014, 4 pages. U.S. Patent and Trademark Office, Alexandria VA US.
Final Office Action for U.S. Appl. No. 12/714,810 mailed Oct. 31, 2013, 18 pages. U.S. Patent and Trademark Office, Alexandria VA US.
Non-Final Office Action for U.S. Appl. No. 12/714,810 mailed Jul. 2, 2013, 22 pages. U.S. Patent and Trademark Office, Alexandria VA US.
Examiner's Answer for U.S. Appl. No. 12/144,987 mailed Jul. 5, 2013, 23 pages. U.S. Patent and Trademark Office, Alexandria VA US.
Advisory Action for U.S. Appl. No. 12/144,987 mailed Mar. 25, 2013, 3 pages. U.S. Patent and Trademark Office, Alexandria VA US.
Final Office Action for U.S. Appl. No. 12/144,987 mailed Dec. 7, 2012, 21 pages. U.S. Patent and Trademark Office, Alexandria VA US.
Advisory Action for U.S. Appl. No. 12/144,987 mailed Aug. 29, 2012, 8 pages. U.S. Patent and Trademark Office, Alexandria VA US.
Final Office Action for U.S. Appl. No. 12/144,987 mailed May 7, 2012, 29 pages. U.S. Patent and Trademark Office, Alexandria VA US.
Non-Final Office Action for U.S. Appl. No. 12/144,987 mailed Oct. 27, 2011, 25 pages. U.S. Patent and Trademark Office, Alexandria VA US.
Cross Reference to Related Applications Under 37 C.F.R. § 1.78, 2 pages, Jul. 1, 2011.
OCP (Open Core Protocol) Specification, Release 2.0, OCP International Partnership, OCP-IP Association, 210 pages, 2003.
Weber, Wolf-Dietrich et. al, A Quality-of-Service Mechanism for Interconnection Networks in System-on-Chips, 1530-1591/05, IEEE, 6 pages, 2005.
Wingard, Drew, A Non-Blocking Intelligent Interconnect for AMBA-Connected SoCs, Sonics, Inc., CoWare Arm Developer's Conference, 39 pages, Oct. 6, 2005.
Wingard, Drew, Socket-based Design Using Decoupled Interconnects, Interconnect-Centric Design for Advanced SOC and NOC, 30 pages, 2002.

\* cited by examiner (A) | Request Valid | Middle Bit | Priority | Page Hit | Direction | Chip | LRS |

(B) | Request Valid | Middle Bit | QoS | Page Hit | Direction | Chip | LRS |

APPARATUS AND METHODS TO CONCURRENTLY PERFORM PER-THREAD AS WELL AS PER-TAG MEMORY ACCESS SCHEDULING WITHIN A THREAD AND ACROSS TWO OR MORE THREADS

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to memory scheduling. More particularly, an aspect of an embodiment of the invention relates to per-thread and per-tag memory access scheduling.

BACKGROUND OF THE INVENTION

Out-of-Order processing allows a processor to avoid stalling which can occur when data needed to perform an operation is unavailable. For example, an out-of-order processor may avoid a stall when the instruction is not completely ready to be processed due to missing data by filling what would otherwise be unfilled time slots with other instructions that are ready to be executed. In some cases the results might be re-ordered after execution such that it appears that the instructions were processed as normal.

In some computer systems, the processor might run substantially faster than the memory. Accordingly, the time that an in-order processor spends waiting for data to arrive could be used to process a large number of instructions using an out-of-order processor.

SUMMARY OF THE INVENTION

Various methods and apparatus are described for an integrated circuit including one or more initiator Intellectual Property (IP) core, one or more target IP core. An interconnect for an integrated circuit communicates transactions between the one or more initiator Intellectual Property (IP) cores and one or more target IP cores coupled to the interconnect. Accordingly, the interconnect can provide the connection between, for example, the processor and the memory. In various embodiments, a tag and thread logic may be configured to concurrently perform per-thread and per-tag memory access scheduling within a thread and across multiple threads such that the tag and thread logic manages tags and threads to allow for per-tag and per-thread scheduling of memory accesses requests from the initiator IP core out of order from an initial issue order of the memory accesses requests from the initiator IP core. The tag and thread logic may be located in a portion of the memory scheduler, in a target agent, or portions of the tag and thread logic may be located in the memory scheduler and the target agent.

BRIEF DESCRIPTION OF THE DRAWINGS

The drawings refer to embodiments of the invention in which:

FIG. 9 illustrates a block diagram of an embodiment of a tag arbiter and a thread arbiter.

Figure 1:
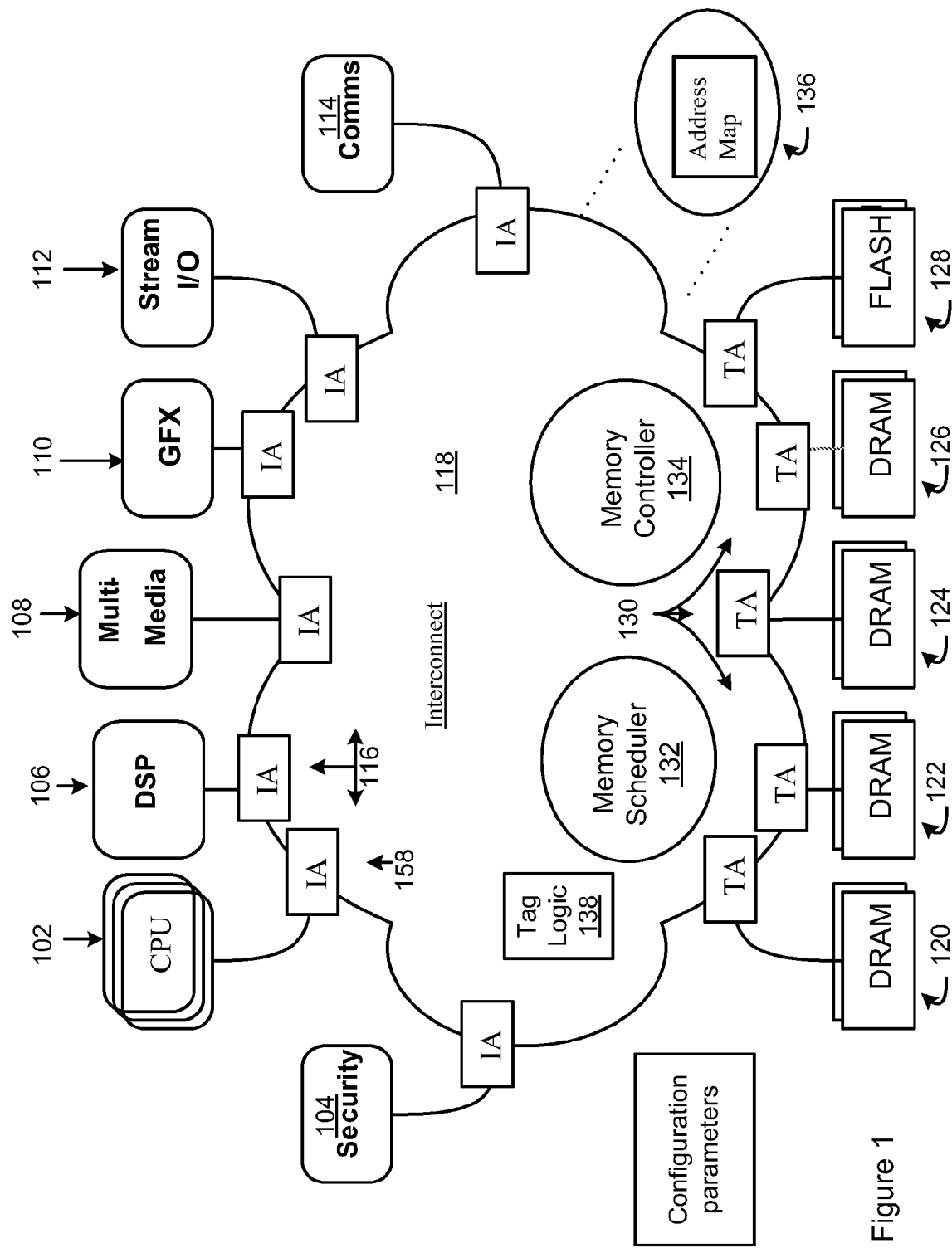
FIG. 1 illustrates a block diagram of an embodiment of a System-on-a-Chip having multiple initiator IP cores and multiple target IP cores that communicate transactions such as read and write requests, burst requests, as well as responses to those transactions over an interconnect.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of memory channels in an aggregate target, etc., in order to provide a thorough understanding of the present invention. However, it will be apparent to a person of ordinary skill in the art that the present invention may be practiced without these specific details. In other instances, well known components or methods have not been described in detail, but rather in a block diagram in order to avoid unnecessarily obscuring the present invention. Further, specific numeric references, such as first target, may be made. However, the specific numeric reference should not be interpreted as a literal sequential order, but rather interpreted that the first target is different than a second target. Thus, the specific details set forth are merely exemplary. The specific details may be varied from, and still be contemplated to be, within the spirit and scope of the present invention.

Some embodiments include systems, methods, and apparatus for concurrently performing per-thread and per-tag memory access scheduling. In one example, a method can include applying an efficiency algorithm to determine if a first memory operation can be performed in fewer clock cycles than a second memory operation. A latency algorithm can be applied to determine a latency between the start of each memory operation and completion of each memory operation. Additionally, the order of the first memory operation and the second memory operation may be optimized based on overall memory efficiency accesses and per-thread Quality-of-Service latency requirements.

For example, in some embodiments a system, method, or apparatus may re-ordering a servicing order of the first memory operation and the second memory operation based on the optimization such that requested memory operations are performed out of an issue order. This can be based on a per-thread and per-tag memory access scheduling within a thread and across multiple threads based on the tag and thread of the first memory operation and the tag and thread of the second memory operation.

One example method includes sending a memory operation, assigned with a thread identification and a tag identification, to be serviced by a downstream memory. Additionally, the memory operations coming into a tag and thread logic may be separated into per-thread requests and per tag requests within each thread. This may allow the tag and thread logic to use a tag level parallelism within these threads to optimize overall memory efficiency accesses.

In various embodiments, the method may be performed by executing instructions on an initiator. For example, tag and thread logic within a system can include the initiator. Additionally, various systems may concurrently perform per-thread and per-tag memory access scheduling within a thread and across multiple threads such that the tag and thread logic manages tags and threads to allow for per-tag and per-thread scheduling of memory accesses out of an initial issue order.

In addition, a transaction from a thread from an initiator IP core may be routed to a multiple channel aggregate memory target IP core, in which the transaction traffic consists of both non-channel-splitting requests and channel-splitting requests. The multiple channel aggregate memory target IP core includes two or more memory channels that populate an address space assigned to that multiple channel aggregate memory target IP core. The multiple channel aggregate memory target IP core appears as a single target to the one or more initiator IP cores. The tag logic may assign a first interconnect tag id number to a first transaction and a second interconnect tag id number to a second transaction from the same thread from a given initiator IP core being routed to the multiple channel aggregate memory target IP core. Next, the tag logic detects whether a request of the first transaction from the thread spans over at least a first and second memory channel in the multiple channel aggregate memory target IP core. If so, the tag logic applies interlocks so that in terms of correctness, all of the responses of the first transaction and second transaction are routed back across the interconnect to the first initiator IP core in the expected execution order.

Most aspects of the invention may be applied in most networking environments and an example integrated circuit such as a System-on-a-Chip environment will be used to flush out these aspects of the invention.

FIG. 1 illustrates a block diagram of an embodiment of a System-on-a-Chip having multiple initiator IP cores and multiple target IP cores that communicate transactions such as read and write requests, burst requests, as well as responses to those transactions over an interconnect. Each initiator IP core such as a CPU IP core 102, an on-chip security IP core 104, a Digital Signal Processor (DSP) 106 IP core, a multimedia IP core 108, a Graphics IP core 110, a streaming Input-Output (I/O) IP core 112, a communications IP core 114, such as a wireless transmit and receive IP core with devices or components external to the chip, etc. and other similar IP cores may have its own initiator agent 116 to interface that IP core to the remainder of the interconnect 118. Each target IP core, such as a first DRAM IP core 120 through a fourth DRAM IP core 126 as well as a FLASH memory IP core 128, may have its own target agent 130 to interface that IP core to the remainder of the interconnect 118. Each DRAM IP core 120-126 may have an associated memory scheduler 132 as well as DRAM controller 134.

The Intellectual Property cores (IP) have self-contained designed functionality to provide that macro function to the system. Examples of initiator IP cores include processors, microprocessors, MPEG decoder blocks of functionality, wireless communication blocks of logic, or other control logic. In some embodiments, the initiator IP core may be implemented in the integrated circuit. In other embodiments, the initiator IP core might be implemented in programmable logic. Additionally, in some embodiments, the initiator might be implemented in an integrated circuit that includes a programmable logic device such as a field programmable gate array, programmable logic array, System on a Chip, etc. The target IP core can include a memory and be coupled to the initiator IP core. For example the initiator IP core and the target IP core may comprise a processor coupled to the memory. The memory may store instructions and data for the processor, which can read the data and instructions and execute the instructions to perform various functions.

For example, initiator property cores Central processing unit 102, multi-media core 108, communication core 114 all have logic and software configured to provide that macro function to the interconnect. Likewise, target IP core Dynamic random access memory (DRAM) 126 provides that function to the system. The interconnect 118 implements an address map 136 with assigned address for the target IP cores 120-128, and potentially the initiator IP cores 102-114 in the system to route the requests, and potentially responses between the target IP cores 120-128 and initiator IP cores 102-114 in the integrated circuit. Most of the distinct IP cores communicate to each other over the interconnect 118 as well as through the memory IP cores 120-126, on and off chip. The DRAM controller 134 and address map 136 in each initiator agent 116 and target agent 130 abstracts the real IP core addresses of each DRAM IP core 120-126 from other on-chip cores by maintaining the address map and performing address translation of assigned logical addresses in the address map to physical IP addresses.

The address mapping hardware logic may also be located inside an initiator agent. The DRAM scheduler 132 and controller 134 may be connected downstream of a target agent or located within the interconnect 118. Accordingly, one method for determining the routing of requests from initiators to targets is to implement an address mapping apparatus that associates incoming initiator addresses with specific target IP cores.

The interconnect 118 provides a shared communications bus between IP core sub-systems 120-128 and 102-114 of the system. All the communication paths in the shared communication bus need not pass through a single choke point, rather many distributed pathways may exist in the shared communication bus. The on-chip interconnect 118 may be a collection of mechanisms that may be adapters and/or other logical modules along with interconnecting wires that facilitate address-mapped and arbitrated communication between the multiple Intellectual Property cores 102-114 and 120-128.

The interconnect 118 may be part of an integrated circuit, such as System-on-a-Chip, that is pipelined with buffering to store and move requests and responses in stages through the System-on-a-Chip. The interconnect 118 may be part of an integrated circuit, such as System-on-a-Chip, that is pipelined with buffering to store and move requests and responses in stages through the System-on-a-Chip. The interconnect 118 may have flow control logic that 1) is non-blocking with respect to requests from another thread, as well as with respect to requiring a response to an initial request before issuing a subsequent request from the same thread, 2) implements a pipelined protocol, and 3) maintains each thread's expected execution order. The interconnect 118 also may support multiple memory channel modules in a single aggregate target, with 2D and address tiling features, response flow control, chopping of individual burst requests, and distribution of requests headed to that aggregate target in either a linear or non-linear sequential pattern in channel round order. Each initiator IP core may have its own initiator agent to interface with the interconnect. Each target IP core may have its own target agent to interface with the interconnect.

A target core, such as an OCP slave, should normally return responses to request transactions made by the initiator core, such as an OCP master, in the same order in which the requests were issued by the OCP master. However, sometimes it makes more sense for the OCP slave to return serviced responses out of their expected order to the OCP master and let logic in the interconnect to handle the ordering of the transaction. Tag identification numbers can be used to directly link the response with the original thread generating the transaction request that triggered the response from the OCP slave. In many cases, the use of tag logic within the interconnect, such as located in an agent, assigns tags to improve overall system performance by allowing multiple transactions from the same thread of a multiple threaded initiator to be outstanding over the interconnect to two or more different targets at the same time.

An initiator IP core may generate a thread of related transactions. The tag logic allows the transactions to be tagged, and, on the basis of that tag, to be treated differently. This allows for dataflows from different initiator IP cores/masters or even different threads from the same initiator to be identified by target/slave cores, facilitates differential quality of service to distinct data streams and often improves performance by allowing transfer reordering to suit subsystem timing constraints (e.g. in DRAM controllers). Tag ids for transactions from same thread allows multiple transactions (burst requests, requests, etc) from same source to be outstanding/processed in parallel while minimizing dedicated buffer space and logic per thread. A multiple threaded initiator uses threads to have multiple transactions processed in parallel. However, the combination of assigning various tag identification numbers from same thread for one or more of the independent thread steams allows multiple transactions processed in parallel with a minimum or at least lower amount of dedicated storage space area and logic per thread occupied on the integrated circuit to allow the initiator transactions to be processed both in parallel and potentially serviced out of issue order while being returned back to the initiator IP core realigned in expected execution order and eliminates any need for a re-order buffer per thread per initiator core. Tags can be thought of as being more "lightweight" than threads for providing out-of-order responses from the target core while ensuring that the response is returned back to the initiator IP core realigned in expected execution order. In particular, multiple threads provide independent flow control for each thread, while tags use a single shared flow of control for all tags. Also, the tag logic is further configured to apply no ordering rules for transactions on different threads, while regulating that certain transactions with an assigned first internal interconnect tag id number from the same thread cannot be re-ordered or be allowed to be serviced before other interconnect tag id numbers when headed to the same target IP core. Finally, independent buffering is required for each thread, while shared buffering requirements for tags can occur since the flow control is shared between all tags. Also, most major protocols currently do not have a flow control mechanism set out for tag related transaction flows unlike established transaction flows for threads.

Each memory channel module may be an IP core or multiple external DRAM chips ganged together to act as a single aggregate memory to match the width of a data word such as 64 bits or 128 bits. Each memory IP core and DRAM chip may have multiple banks inside that IP core/chip. Each channel in a memory channel module may contain one or more buffers that can store requests and/or responses associated with the channel. These buffers can hold request addresses, write data words, read data words, and other control information associated with channel transactions, and can help improve memory throughput by supplying requests and write data to the memory, and receiving read data from the memory, in a pipelined fashion. The buffers can also improve memory throughput by allowing a memory scheduler to exploit address locality to favor requests that target a memory page that is already open, as opposed to servicing a different request that forces that page to be closed in order to open a different page in the same memory bank.

Tag logic located in the DRAM scheduler 132, the target agent 130, or portions located in both is configured to re-order a servicing order of the memory operations based on an optimization such that requested memory operations are performed out of an issue order, which can be based on a per-thread and per-tag memory access scheduling within a thread, and across multiple threads based on a tag and thread of the first memory operation and a tag and thread of the second memory operation. The optimized decisions may be based on overall memory efficiency accesses and per-thread Quality of Service latency requirements to re-order the servicing order of per-tag requests within the same thread and the servicing of the memory accesses requests.

Figure 2:
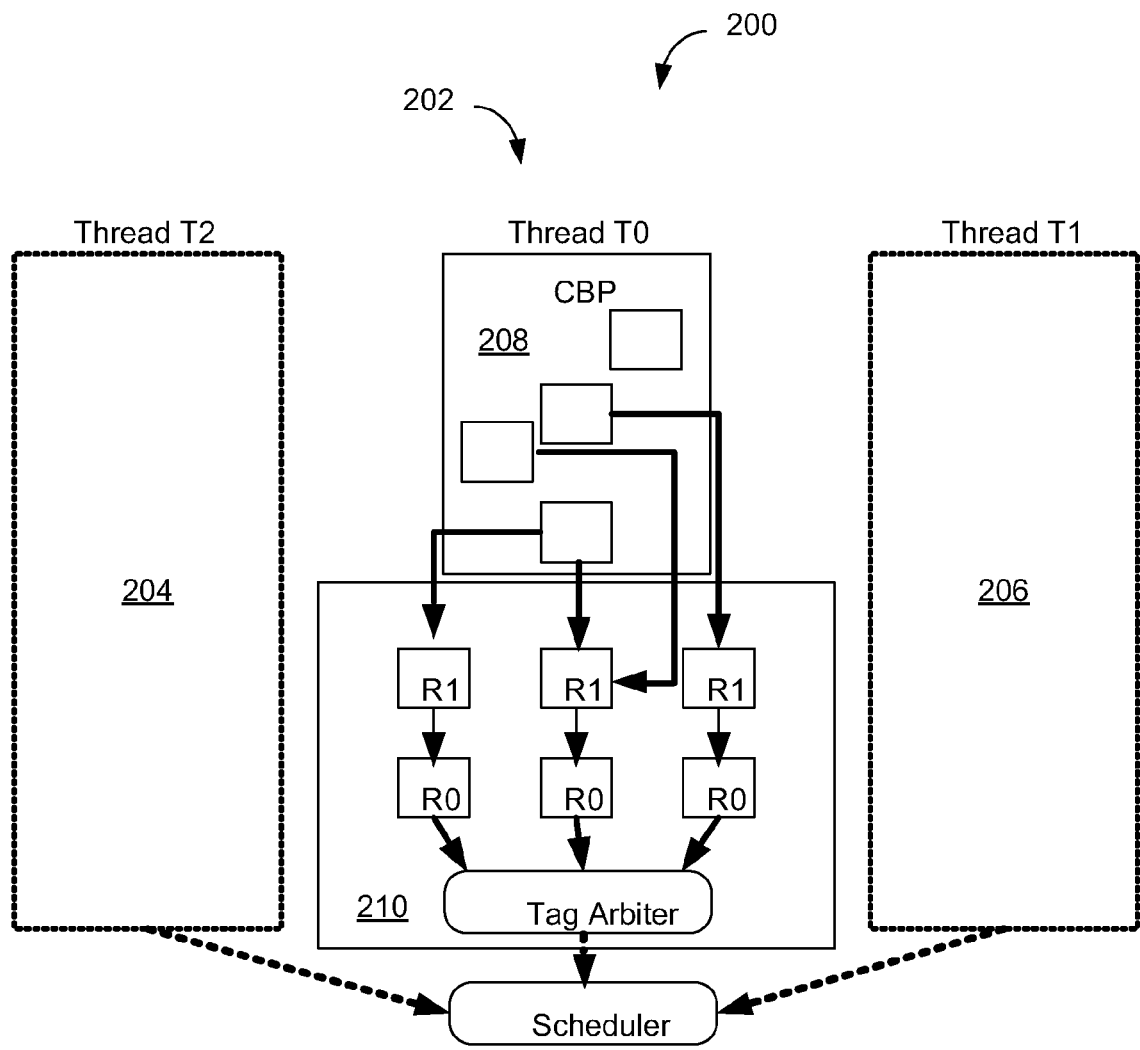
FIG. 2 illustrates a block diagram of an embodiment of tag and thread arbiters.

FIG. 2 illustrates a block diagram of an embodiment of tag and thread arbiters 200. As illustrated in FIG. 2, there may be a tag-arbiter per thread 202, 204, and 206 to arbitrate between IFIFOs of the same thread and a thread arbiter, which can arbitrate among the output of each tag arbiter.

In some embodiments, a logic circuit can ensure that data phases of a request are available before the request can be scheduled. This logic circuit may also be applied on a per tag basis on each thread. For example, the logic circuit may store both thread ID and tag ID of a request.

The integrated circuit may include an initiator Intellectual Property (IP) core, a target IP core with a memory, and the target IP core coupled to the initiator IP core using an interconnect. The interconnect can allow an integrated circuit to communicate transactions between one or more initiator Intellectual Property (IP) cores and one or more target IP cores coupled to the interconnect.

Some embodiments include tag and thread logic that can be configured to concurrently perform per-thread and per-tag memory access scheduling within a thread and across multiple threads. The tag and thread logic manages tags and threads to allow for per-tag and per-thread scheduling of memory accesses requests from the initiator IP core out of order from an initial issue order of the memory accesses requests from the initiator IP core. A memory scheduler can be coupled to the memory in some embodiments. Additionally, the memory scheduler or other device in the system may include the tag and thread logic.

In some embodiments, the tag and thread logic handles servicing of tags and threads concurrently by applying an efficiency and latency algorithm to optimize decisions. This optimization may be based on overall memory efficiency accesses and per-thread Quality of Service latency requirements. Additionally, the system may re-order a servicing order of per-tag requests within a same thread and a servicing of the memory accesses requests from the initiator IP core potentially being out order from of an issue order.

In various embodiments, the tag and thread logic, such as the memory scheduler or a target agent, sends requests assigned with thread identifications and tag identifications to be serviced by a downstream DRAM memory and the memory scheduler performs per-thread as well as per-tag scheduling. In some examples, the requests routed into the tag and thread logic e.g., the memory scheduler or target agent, are first separated into per-thread requests, and then per-tag requests within each thread such that the tag and thread logic may use the tag level parallelism within these threads to optimize overall memory efficiency accesses.

In some embodiments, the tag and thread logic may be located as a portion of the memory scheduler and the memory scheduler can be integrated into any environment including a tag based memory scheduler which operates with AXI protocol based interconnects. The AXI protocol based interconnects block use of the interconnect during a servicing of a request, as well as the tag based memory scheduler further operating with OCP protocol based interconnects, which allow non-blocking use of the interconnect during servicing of a request.

Thus, the same logic and flow control logic can be used for the interconnect and/or memory scheduler independent of the class of protocol being used, such as an AXI class of protocol or an OCP class of protocol. The main difference would be in an amount of hardware instantiated at an interface. An OCP class of protocol has hardware and logic instantiated in a single interface to allow non-blocking flow control for every thread passing through that single OCP interface. An AXI class of protocol has hardware and logic instantiated on a per thread basis and each thread would pass through its own port on that interface and be serviced by the logic dedicated for that thread. The interface for an AXI class of protocol would be multiple ported and control the servicing of a thread with logic that is dedicated to that thread but instantiated an amount of time equal to a number of AXI threads using that interface.

How tag and thread logic is used in AXI and OCP cases. With the above hardware differences in operation, tags reorder units may still live within a shared flow control domain and just have the constraints on ordering mentioned herein. Each thread expects reordering of requests within that thread may occur while independent flow control occurs for the threads of the system to prevent blocking between the threads.

In other embodiments, the tag and thread logic may be located in a target agent and wherein the target agent also includes a set of internal FIFOs. The target agent might also include a controller for allocating requests to each of the internal FIFOs. Further, in various embodiments, the memory scheduler performs per-thread as well as per-tag scheduling and allows the concurrent scheduling of the servicing of the per thread and per tag request by a downstream memory to occur out of issue order. Instead of in-order servicing, the requests might be serviced based on optimum memory efficiency and latency factors. For example, requests coming into the memory scheduler may first be separated into per-thread requests, and within each thread, the memory scheduler can exploit the tag level parallelism within these threads.

In an embodiment, the tag and thread logic comprises both a target agent and a portion of the memory scheduler and wherein the tag based memory scheduler can send QoS latency sensitive traffic on separate thread identifications.

Although the FIFO buffers may have logic to track whether a given stored request entry arrived earlier or later than another stored request entry, the servicing logic generally does not select request entries stored in the FIFO based on a relative time that the entry was place in the FIFO except under a few conditions that will be described below. In FIG. 2 the boxes within command buffer pool (CBP) 208 of thread T0 are shared storage for all the tags within a same thread and not dynamically assigned to any specific tag. The shared storage buffers are used for temporary storage of incoming requests or requests marked with special handling requirements. As illustrated in FIG. 2 for thread T0 202, concurrent thread and tag logic and its buffers similarly exists for Threads T1 206 and T2 204, which duplicate the components of illustrated for Thread T0. The R1 and R0 labeled boxes indicate registers connected to the T0 tag arbiter in block 210.

Some embodiments may include a special way of handling read locking requests. For example, address content locking logic may be configured to support when an initiator IP block sends a specially marked read request for either a tag identification or thread identification that indicates that the initiator wishes for a section of memory address to have its content locked. Such a read may lock a memory address until a new clearing write request is transmitted or sent from the initiator and received by the locking logic.

Additionally, in some embodiments, a logic and an associated crossover queue may be configured to perform a series of requests in order by marking the data to ensure that service ordering restrictions are observed across these two or more different request tag identifications. The crossover queue can store the thread identification, tag identification, and an indication that the request that was issued was issued with an ordering restriction.

For example, some embodiments may include a special way of handling write requests that require tags to be executed in order with the help of a crossover queue. Generally, requests with separate tag IDs from the same thread and from the same initiator have no service-ordering requirement across different tag IDs. The logic may allow a requests from different tag identifications to be serviced out of issue order in a way that might maximize memory efficiency and QoS latency Requirements. However, the logic that require tags to be executed in order ("TagInorder logic") might support when an initiator IP block sends a specially marked read or write request for a tag ID.

The TagInOrder can indicate that the initiator wishes a service-ordering requirement exists between the marked incoming requests of a first tag ID and the marked incoming requests of a second tag ID. The TagInorder logic and associated crossover queue configured to perform a read request and/or a write request than the write requests associated data are marked to ensure the service ordering restrictions are observed across these two or more different request tag IDS. The RTIDQ crossover queue may store the thread ID, tag ID, and MTagInorder (if enabled) of the request that was issued with a MTagInorder indication. For the responses, in addition to assigning the SThreadID to the response, STagID, and STagInorder (if enabled) should also be assigned.]

Figure 3:
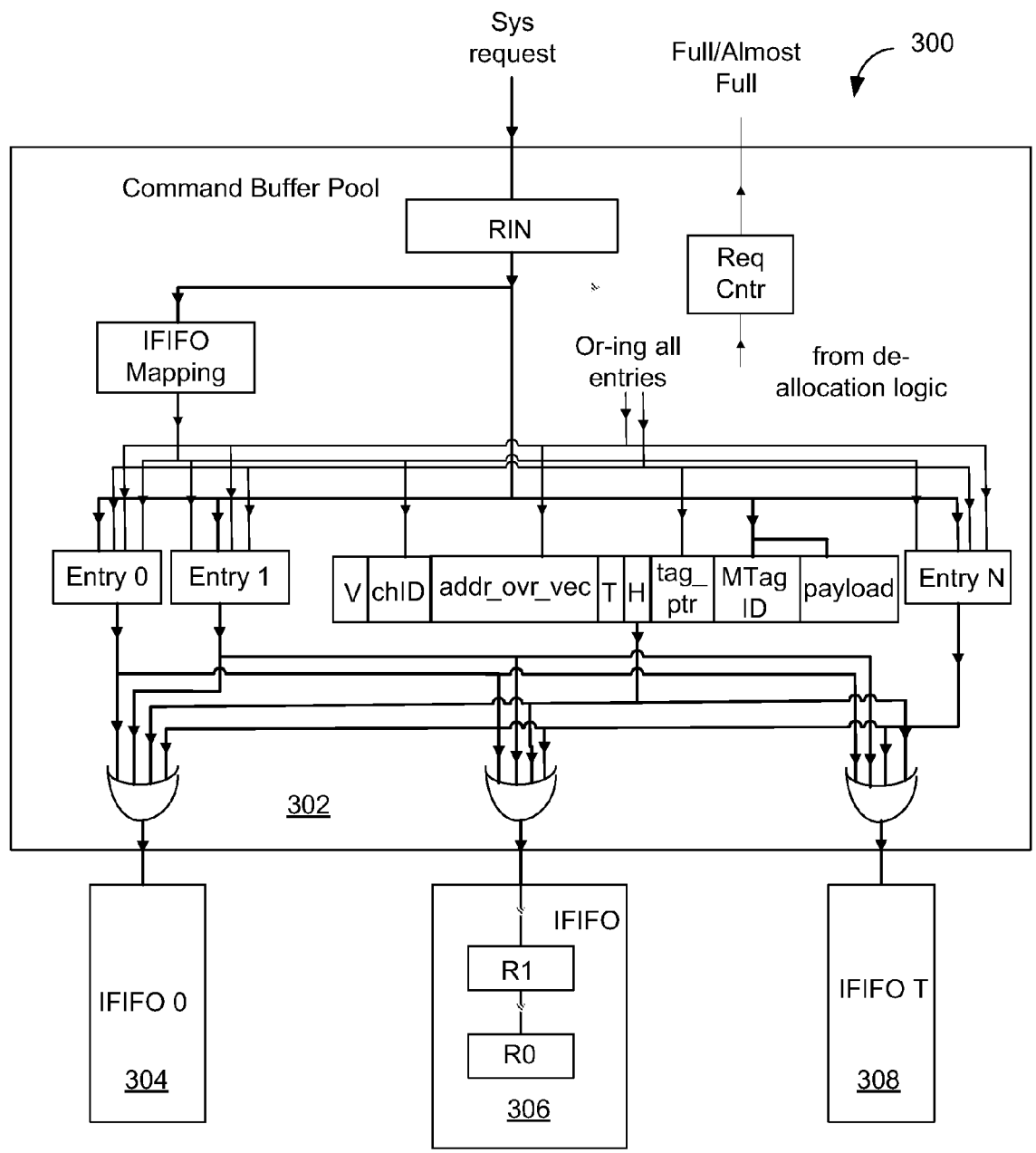
FIG. 3 illustrates a block diagram of an embodiment of a command buffer pool architecture.

FIG. 3 illustrates a block diagram 300 of an embodiment of a command buffer pool architecture in. A command buffer pool 302 may be configured for in-order allocation and out-of order de-allocation. Additionally, in some embodiments, the command buffer pool 302 can be configured for multiple de-queues in a same cycle, wherein the command buffer pool has a set of internal FIFO buffers 304, 306, and 308 that are dynamically assignable storage buffers to handle parallelism. The command buffer pool 302 may also include logic for allocating requests to each of the internal FIFOs, 304, 306, and 308 the integrated circuit further comprising logic that locks an allocation of an internal FIFO buffer 304, 306, 308 to be used by request with a given tag identification during a period of time such that the dynamically assignable buffers are locked by the logic to a single thread when assigned to a specific tag of a thread but over time during an operation of the integrated circuit, the logic assigns a given buffer between a set of tag IDs making up a given thread.

Figure 4:
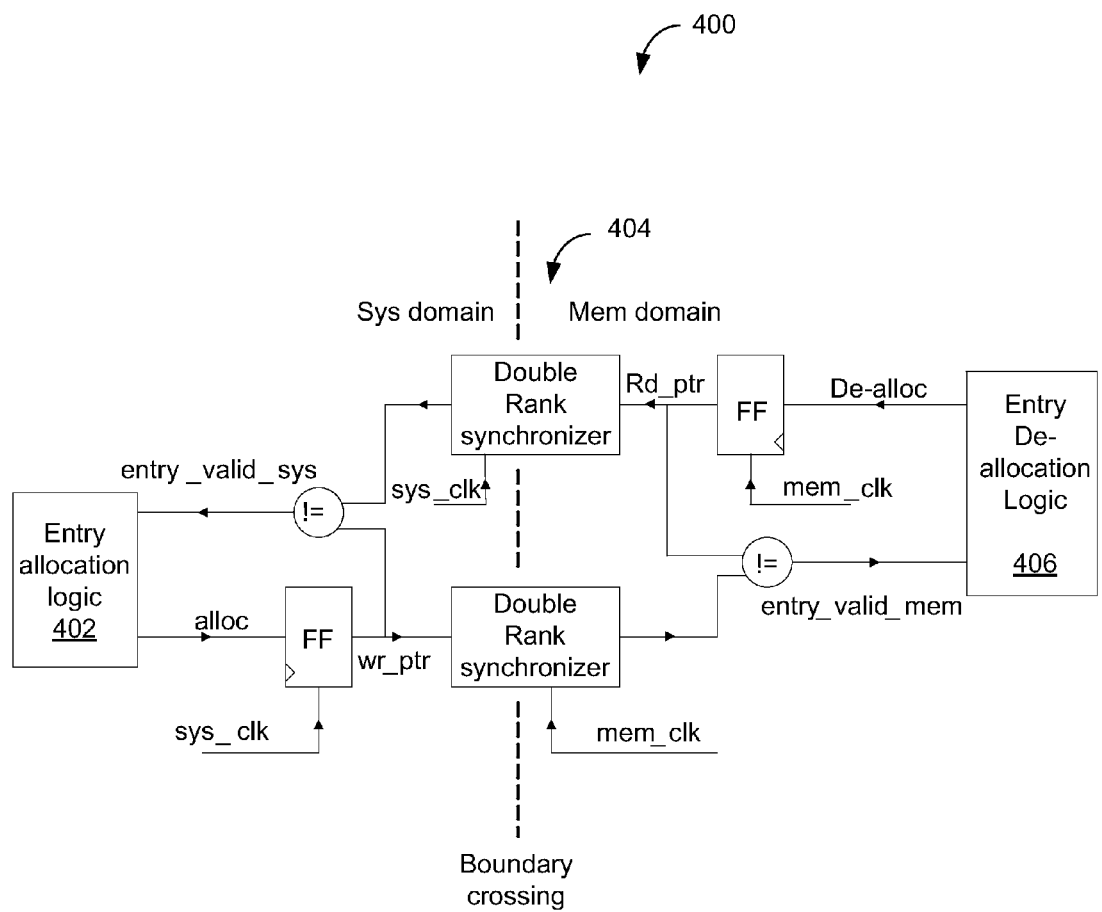
FIG. 4 illustrates a block diagram of an embodiment of a clock domain crossing.

FIG. 4 illustrates a block diagram 400 of an embodiment of a clock domain crossing. In some embodiments, a command buffer pool may include asynchronous crossing capability. For example, a clock domain crossing may provide for entry allocation logic 402 before a boundary crossing 404 and an entry de-allocation logic 406 after the boundary crossing 404. Asynchronous crossing capability may include a clock domain logic that may use an existing bit field in a request for tag identifications. Thread identifications might be used for the purposes of synchronizing the clock domains, such that a clock domain logic uses an existing bit field in a request for tag identifications and thread identifications for the purposes of synchronizing the clock domains between a bus interconnect clock domain and a memory scheduler clock domain. An example of such an existing bit field is the V valid field.

Figure 5:
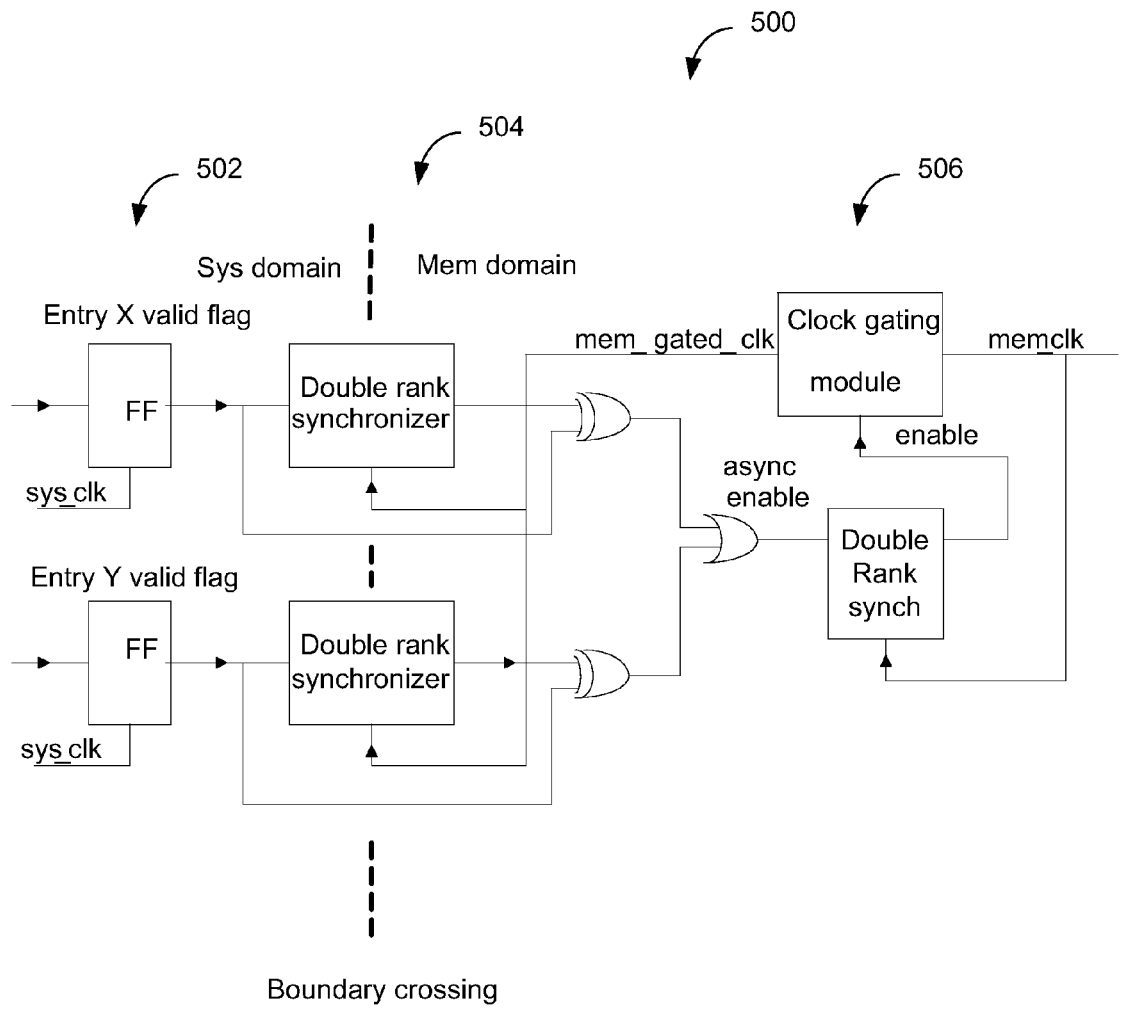
FIG. 5 illustrates a block diagram of an embodiment of clock gating in domain crossing.

FIG. 5 illustrates a block diagram of an embodiment of clock gating in domain crossing 500. For example, in asynchronous designs valid flags of all pointers and entries might be synchronized using synchronizer illustrated in FIG. 5. Such synchronization may set a valid flag when writing the system domain 502 and then synchronize it after a boundary crossing 504 to the read memory domain 506. In some embodiments, when clearing the flag it might be cleared first on a read domain and then synchronized to write domain. In asynchronous designs a gated clock may be used to synchronize valid bits and to enable gated clocking.

Figure 6:
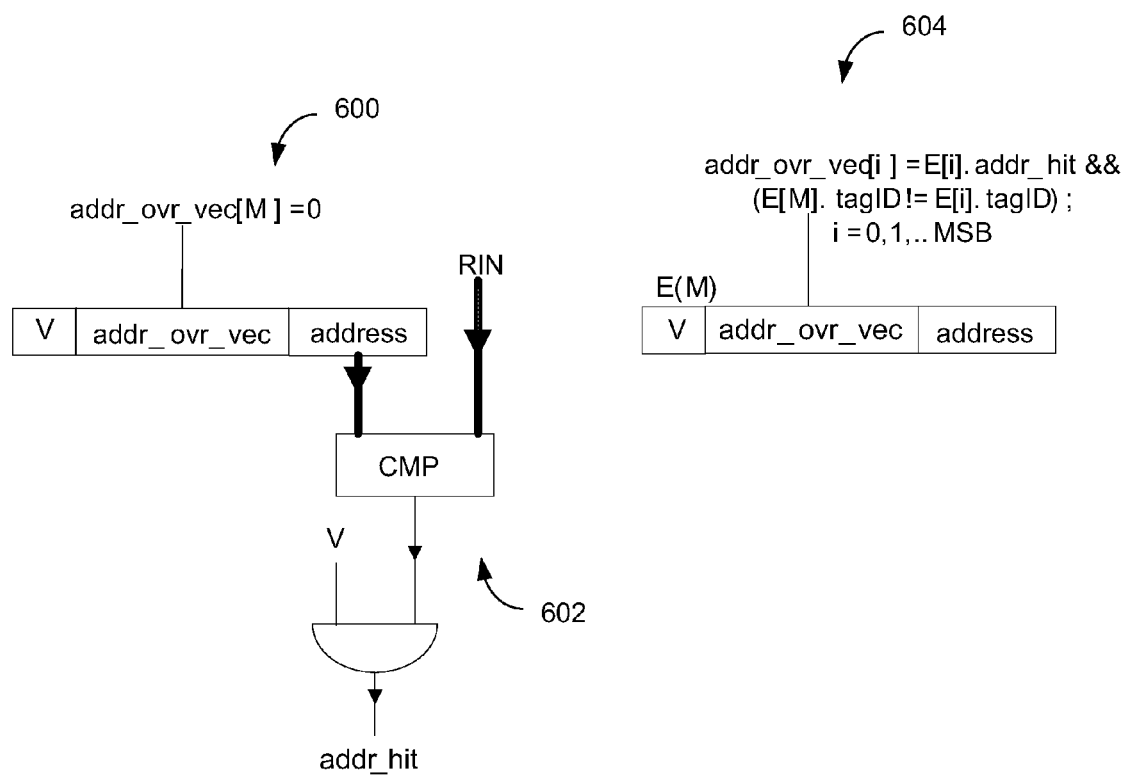
FIG. 6 illustrates a block diagram of an embodiment of address overlap structure.

FIG. 6 illustrates a block diagram of an embodiment of address overlap structure. Some embodiments may use a special address overlap checking circuit 600 for checking address overlap between requests using, for example, a compare 602. Some embodiments may force order if there is an address overlap.

The address overlap checking circuit 600 may enforce a servicing order between requests of separate tag identifications of a thread when header information 604 of an incoming request to an input register of the address overlap checking circuit indicates an overlap exists. The checking circuit 600 may provide an absolute ban on allowing re-ordering tags when both tags wish to either read or write to memory addresses that overlap. The checking circuit 600 may alternatively allow reordering the servicing of requests with the same tag IDs merely in the case when both requests from the same tag are both read requests. In this case, merely reading the contents of the memory without any intervening write request to those addresses should not cause any problems. However, in another embodiment, The checking circuit 600 may enforce a servicing order between requests of separate tag identifications of a thread when header information 604 of an incoming request to an input register of the address overlap checking circuit indicates a request is for: 1) read the content of or 2) write new content to an overlapping address in a downstream memory and a request already stored in an awaiting service buffer also indicates the request is for either 1) read the content of or 2) write new content to an overlapping address in the downstream memory and the one or more stored requests are for an opposite function to be performed on a same content in the memory location as an incoming request.

In some embodiments, arbitration can be done in two stages: intra-thread tag arbitration among IFIFOs, and inter-thread arbitration. The intra-thread tag arbiter may have a weight-vector composed of request-valid, middle-bit, page hit, direction and priority as illustrated in FIG. 6. Instead of the QoS, the tag-arbiter consists of a priority bit, which is set to 1 if the starvation counter of the IFIFO is zero. Among IFIFOS, those with priority bit set are given preference over those that do not have priority bit set.

Figure 7:
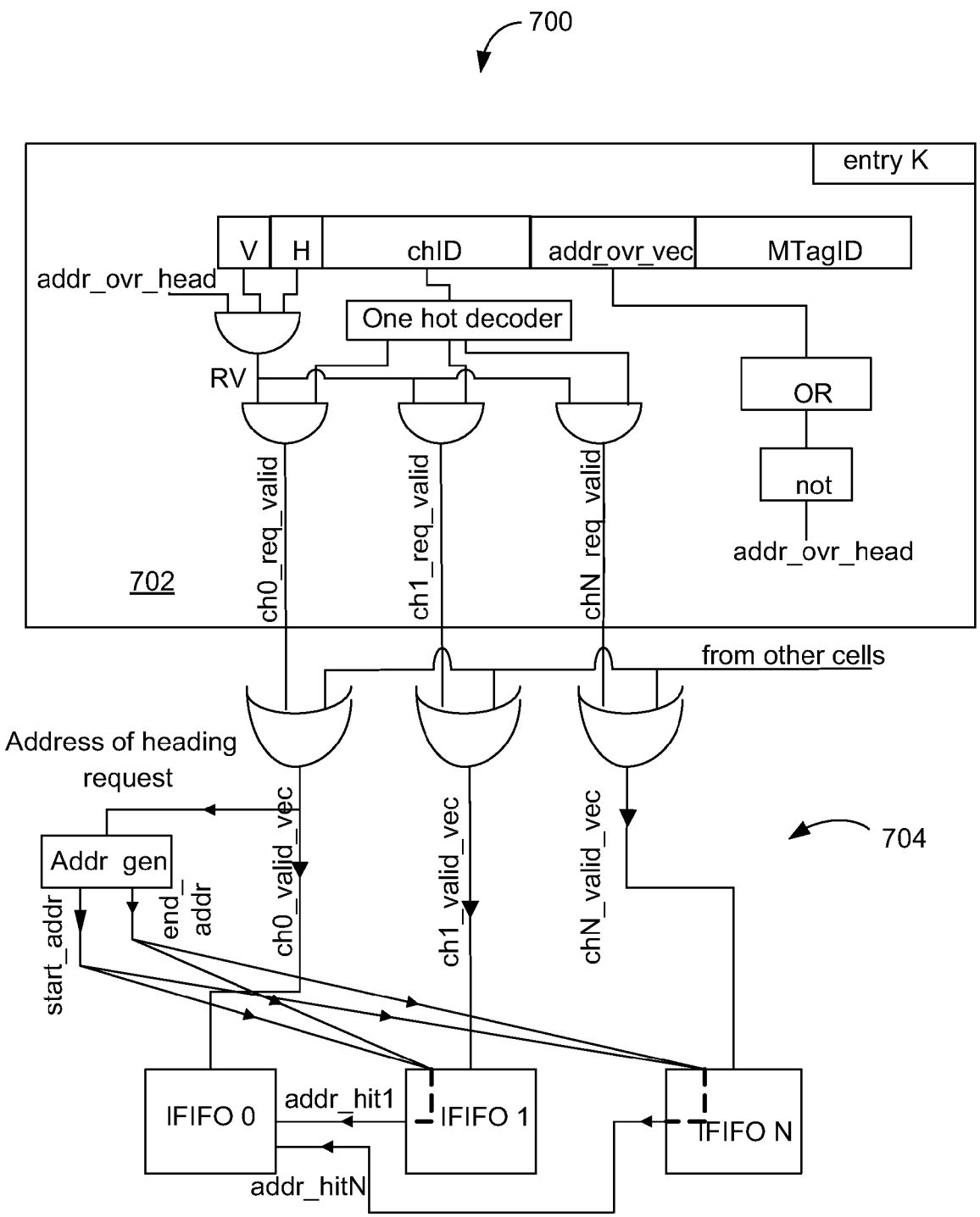
FIG. 7 illustrates a block diagram of an embodiment of an address overlapping check between a heading request.

FIG. 7 illustrates a block diagram of an embodiment of an address overlapping check circuit 700 between a heading request. In some embodiments, the logic 702 and 704 may allow no serving ordering restriction if all of the stored requests want to read the content from the same overlapping memory addresses. However, when a new incoming request wishes to write new content to that overlapping memory address, then the logic may enforce that all of the earlier stored read requests potentially from two or more different tags of that thread may be serviced first prior to allowing the incoming Write request to be serviced by the memory. Additionally, some embodiments may write in new content in the overlapping address of the memory. The logic 702 and 704 can enforce the same restriction for an earlier stored write followed by a later received incoming read request. However, the logic 702 and 704 may still apply the servicing order of stored requests from different tags based on memory efficiency and latency for areas of the memory where there is no indicated address overlap for stored requests of tag IDs that wish to perform opposite functions to the content of the overlapping addresses. Some embodiments can be optionally instantiated or not included based on input parameters from the designer of the Integrated Circuit.

Figure 8:
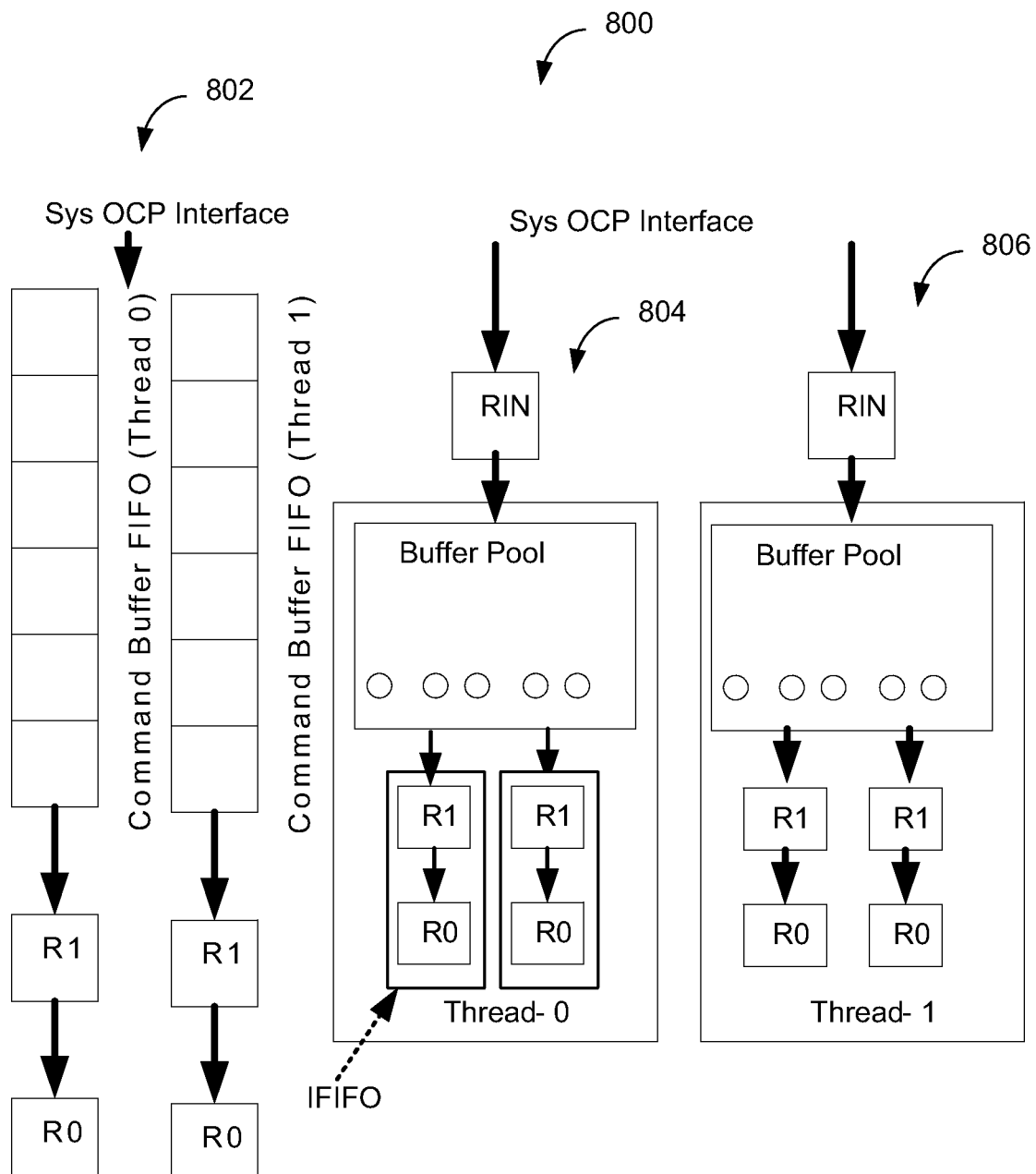
FIG. 8 illustrates a block diagram of an embodiment of a comparison between a FIFO based command buffer and a buffer pool based command buffer.

FIG. 8 illustrates a block diagram of an embodiment of a comparison between a FIFO based command buffer 802 and a buffer pool based command buffer 804 and 806. The command buffer pool 804 and 806 may be used to maintain a pool of entries per thread instead in a "first-in-first-out" arrangement of a FIFO.

In some embodiments the command buffer pool 804 and 806 may maintain a buffer pool of a predetermined size that might be programmed with "request_buffers" parameter in some embodiments for each thread T. The range of that size may be from 1 to 32 in some embodiments. In some examples all entries of the buffer pool can be "floating" and may be allocated or de-allocated based on the requests that arrive at the sys interface on the thread.

Registers in an embodiment may be used to store every request from a system interface into a two deep FIFO RIN. In the next cycle, this request may be allocated an entry into the command buffer pool, ("Buffer Pool") and a number of pointers can be updated. Note that RIN is being used to isolate the timing path of the buffer pool allocation from the system OCP interface timing path.

Various systems and methods described herein map each tag identification from 0 through tags −1 on each thread to a unique internal FIFO (IFIFO). In some embodiments there are $N_T$ (user programmable) IFIFOs per thread, and a tag on a thread may be dynamically mapped to one of the IFIFOs within the thread.

The mapping of the tag to an IFIFO may be done as follows: When there is a pending request (request in CBP, R1 or R0) with the same tag identification (tag ID) that has been assigned an IFIFO, the same IFIFO is assigned to the new request as well. Thus, ordering of requests belonging to the same tag is preserved. If there is no pending request with the same tag ID, and there are no pending data words in the Write Data Buffer with the same tag ID, the request is assigned to the lowest numbered IFIFO, which is free. If no IFIFO is free, a flag (SThreadbusy) may be asserted at the system OCP interface until one of the IFIFOs becomes free. The current request in turn waits in RIN. Note that an IFIFO is free if no MTagID is mapped to the IFIFO.

In order to implement the allocation of internal FIFOs per tag, each IFIFO can maintain a "free" bit. Initially, the free bit can be reset to "1" indicating that the IFIFO can be allocated to an MTagID. The internal FIFOs may also maintain the tag ID to which they are currently mapped. When a request with a given MTagID=T is accepted, it can be assigned an IFIFO. Among all IFIFOs with free bit equal to 1, the one with lowest ID is chosen, and the IFIFO-ID of the request is set to the ID of the IFIFO. Then, the free bit entry of the IFIFO can be updated to 0, and its tag ID field is updated with the MTagID of the request.

When a request with MTagID==T is scheduled, MemMax checks if there is any other request that is pending in the command buffer pool, R1 or R0 that has the same MTagID. If there is no such request, MemMax updates the free bit of the IFIFO to 1, and its tagID is reset. At this point, a new tagID can be assigned to this IFIFO.

Some embodiments include using a two hierarchical level arbiter, wherein a first level arbitrates tags within a thread, and a second level arbitrates threads to concurrently manage tags and threads across multiple memories and wherein logic in the arbiters allows for re-arranging to a servicing order of stored requests associated with a given thread with the same or different tag IDs to increase memory access efficiency and account for Quality of Service latency requirements associated with a given request.

FIG. 9 illustrates a block diagram of an embodiment of a tag arbiter and a thread arbiter. In the illustrated embodiment, the tag and thread logic comprises a two hierarchical level arbiter. A first level arbitrates tags within a thread, and a second level arbitrates threads to concurrently manage tags and threads across multiple memories. The tag and thread logic for the arbiters allows for re-arranging to a servicing order of stored requests associated with a given thread with the same or different tag identifications to increase memory access efficiency and account for Quality of Service latency requirements associated with a given request.

Some embodiments may include a two hierarchical level arbiter, one for tag arbitration within a thread, and one for thread arbitration. A memory scheduler can arbitrate among requests with the same tag ID on the same thread, and re-order them to get maximum memory efficiency. The arbiter may arbitrate first amongst tags within a thread and then proceeds to arbitrate amongst the threads coming from that same initiator Intellectual Property block.]

As illustrated in FIG. 9, arbitration may be done in two stages: intra-thread tag arbitration among IFIFOs, and inter-thread arbitration. The intra-thread tag arbiter can have a weight-vector composed of request-valid, middle-bit, page hit, direction and priority. Instead of the QoS, the tag-arbiter may include a priority bit, which can be set to 1 if the starvation counter of the IFIFO is zero. Among IFIFOS, in various embodiments, those with priority bit set are given preference over those that do not have priority bit set.

Some embodiments may further comprising an algorithm to prioritize memory accesses based on a page hit, memory access direction, and memory chip. Page hits may be a higher priority than bus direction, which can be higher priority than which memory chip is accessed. For example, some systems can include one or more Dynamic Random Access Memories (DRAMs). Read or write efficiencies in memory such as DRAM memory can be affected by changing memory pages, changing the memory bus direction from 'read to write' or from 'write to read,' or changing which DRAM memory chip in a DRAM core is being currently read or written to. Accordingly, some embodiments may lower priority when a new page is to be read or written, when a direction change occurs, or when a different memory chip is to be accessed. Reusing the same page allows using the data already in the cache and no need to look up the address of the desired data to load that information into the page cache. Reversing the memory bus access direction takes time and thus accessing the bus when it is already aligned to the desired direction increases efficiency. Additionally, reads or writes on a new page may have higher priority as compared to reads or writes involving reversing direction and reads or writes involving reversing direction may have a higher priority as compared to changing chips.

Some embodiments of the systems, methods, and apparatus described herein may include a machine-readable storage medium that stores instructions. These instructions might, when executed by a machine, causes the machine to generate model representations for an integrated circuit which may be used in an Electronic Design Automation process.

In order to avoid starvation, some embodiments may maintaining a multi bit, such as an eight-bit, starvation counter for an internal FIFO such that every cycle, the starvation counter is decremented by 1 if the corresponding internal FIFO has a read or write request in its R2 (if present), R1 or R0 register and the internal FIFO is not a winner of the tag arbiter. For example, if the starvation counter value reaches zero, it is not decremented further, a read or write request in a register can be performed and when a last sub-burst of a system request has been scheduled from the internal FIFO, the starvation counter is reset to its programmed value.

Some embodiments include a method of concurrently performing per-thread and per-tag memory access scheduling. The method may include applying an efficiency algorithm to determine if a first memory operation can be performed in fewer clock cycles than a second memory operation and applying a latency algorithm to determine a latency between the start of each memory operation and completion of each memory operation. Various embodiments can optimize an order of the first memory operation and the second memory operation based on overall memory efficiency accesses and per-thread Quality-of-Service latency requirements. Additionally, a servicing order of the first memory operation and the second memory operation can be re-ordered based on the optimization such that requested memory operations are performed out of an issue order, which can be based on a per-thread and per-tag memory access scheduling within a thread and across multiple threads based on a tag and thread of the first and a tag and thread of the second memory operation.

Some embodiments may include the step of sending a memory operation, assigned with a thread identification and a tag identification, to be serviced by a downstream memory. Additionally, memory operations coming into a tag and thread logic might first separated into per-thread requests and then per tag requests within each thread. This can be done such that the tag and thread logic may use a tag level parallelism within these threads to optimize overall memory efficiency accesses.

The methods described herein can be performed by executing instructions on an initiator. For example, a tag and thread logic within a system including the initiator might concurrently perform per-thread and per-tag memory access scheduling within a thread and across multiple threads. This can provide tag and thread logic to manage tags and threads to allow for per-tag and per-thread scheduling of memory accesses out of an initial issue order.

Some embodiments include an integrated circuit, comprising a multiple initiator IP cores, multiple target IP cores including one or more memory IP cores, and an interconnect to communicate transactions between the multiple initiator IP cores and the multiple target IP cores coupled to the interconnect; and a target, including a memory, coupled to an initiator IP core. The integrated circuit might also include a memory scheduler; coupled to one or more of the memory IP cores and the interconnect. Additionally, a tag and thread logic can be configured to concurrently perform per-thread and per-tag memory access scheduling within a thread and across multiple threads. The tag and thread logic can manage tags and threads to allow for per-tag and per-thread scheduling of memory accesses out of an initial issue order. Additionally, the tag and thread logic may be located within one of the following: within the memory scheduler, within the target agent, or found in a portion of both. In some examples, the multiple initiator IP cores, multiple target IP cores, interconnect, and tag and thread logic comprise a System on a Chip.

Some example tag and thread logic may handle servicing of tags and threads concurrently by applying an efficiency and latency algorithm to optimize decisions based on overall memory efficiency accesses and per-thread Quality-of-Service latency requirements. This may re-order a servicing order of per-tag requests within a same thread out of an issue order. Additionally, the tag and thread logic may send a request assigned with thread identifications and tag identifications to be serviced by a downstream memory. Requests coming into the tag and thread logic can first separated into per-thread requests and then per tag requests within each thread. In some embodiments, the tag and thread logic may use tag level parallelism within these threads to optimize overall memory efficiency accesses. Additionally, some embodiments comprise, a machine-readable storage medium that stores instructions, which when executed by the machine causes the machine to generate model representations for the integrated circuit which are used in an Electronic Design Automation process.

Figure 10:
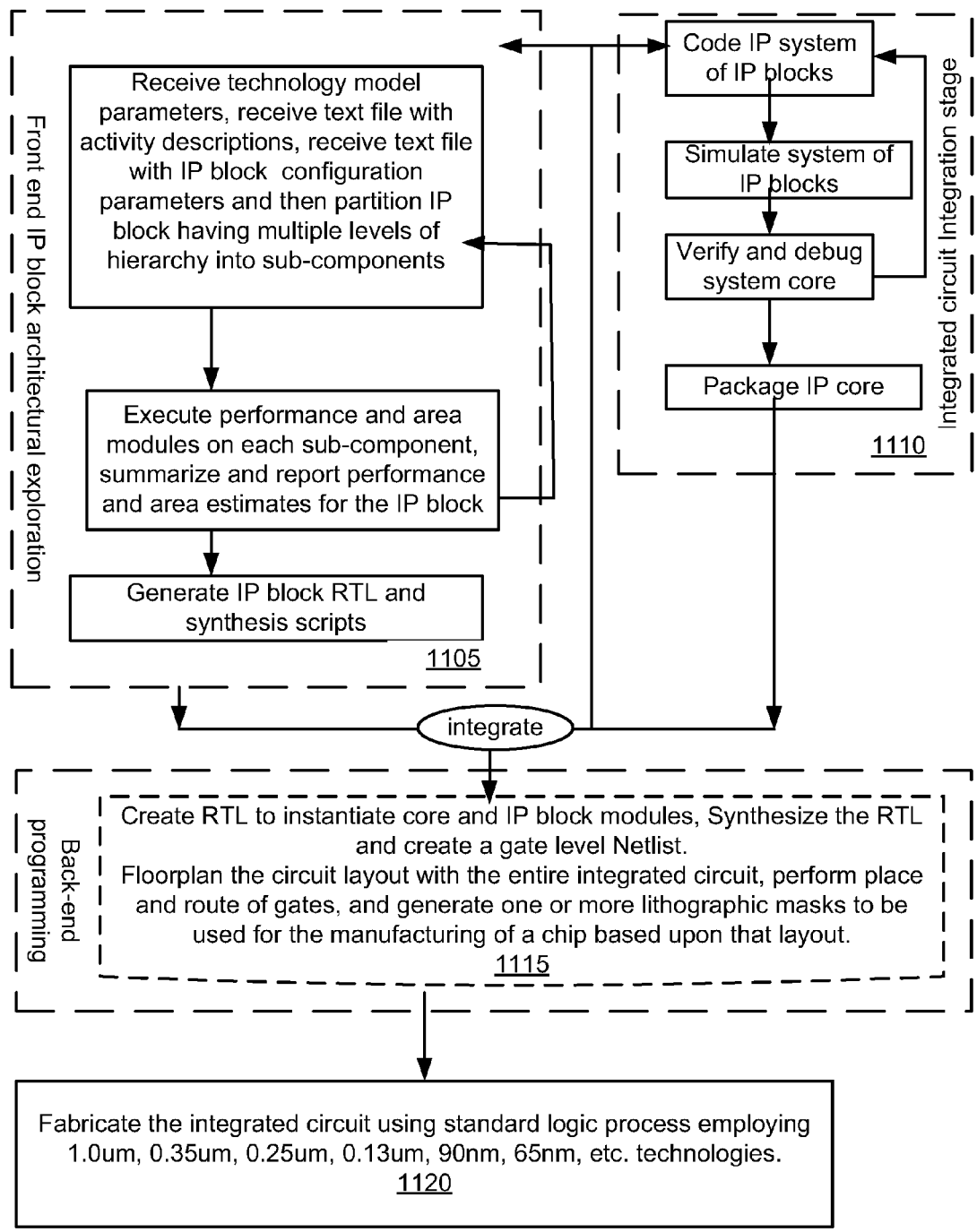
FIG. 10 illustrates a flow diagram of an embodiment of an example of a process for generating a device, such as a System on a Chip.

FIG. 10 illustrates a flow diagram of an embodiment of an example of a process for generating a device, such as a System on a Chip, in accordance with the systems and methods described herein. The example process for generating a device with designs of the Interconnect and Memory Scheduler may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the Interconnect, Memory Scheduler, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or model representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1105, the EDA tool set may receive a user-supplied text file having data describing configuration parameters and a design for at least part of a tag logic configured to concurrently perform per-thread and per-tag memory access scheduling within a thread and across multiple threads. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1110, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1115, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1120, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

As discussed, an EDA tool set may be implemented in software as a set of data and instructions, such as an instance in a software library callable to other programs or an EDA tool set consisting of an executable program with the software cell library in one program, stored on a machine-readable medium. A machine-readable storage medium may include any mechanism that stores information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In an embodiment, the logic consists of electronic circuits that follow the rules of Boolean Logic, software that contain patterns of instructions, or any combination of both. Various components described above may be implemented in hardware logic, software, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

We claim:

1. An interconnect for an integrated circuit, comprising:
where the interconnect is configured to communicate transactions between one or more initiator Intellectual Property (IP) cores and one or more target IP cores, including a target memory core, which are coupled to the interconnect; and
a tag and thread logic configured to concurrently perform per-thread and per-tag memory access scheduling within a thread and across multiple threads such that the tag and thread logic manages tags and threads to allow for per-tag and per-thread scheduling of memory accesses requests from the initiator IP core out of order from an initial issue order of the memory accesses requests from the initiator IP core, where a tag-arbiter per thread is implemented to handle tag parallelism to arbitrate between tagged requests of the same thread to determine an order in which requests in that thread should be scheduled for memory accesses,
wherein the tag and thread logic is configured to handle servicing of tags and threads concurrently by applying an efficiency and latency algorithm to optimize decisions based on overall memory efficiency accesses and per-thread Quality-of-Service latency requirements to re-order a servicing order of per-tag requests within a same thread out of the initial issue order.

2. The interconnect of claim 1, wherein the tag and thread logic is configured to send requests assigned with thread identifications and tag identifications to be serviced by a downstream memory and the requests routed into the tag and thread logic are first separated into per-thread requests, and then per-tag requests within each thread such that the tag and thread logic may use the tag parallelism within these threads to optimize overall memory efficiency accesses.

3. The interconnect of claim 1, wherein the tag and thread logic is located as a portion of a memory scheduler coupled to the memory and the memory scheduler is integrated into a tag based memory scheduler which operates with AXI protocol based interconnects, which use a multiple ported interface to not block use of the interconnect during a servicing of a request, as well as 1) the tag based 2) the thread based or 3) a combination of tag and thread based memory scheduler further operating with OCP protocol based interconnects, allowing both options of blocking or non-blocking use of the interconnect during servicing of a request at the interface, wherein the memory scheduler couples to the interconnect via the interface.

4. The interconnect of claim 1, wherein the tag and thread logic is located in a target agent, wherein the target agent also includes a set of internal FIFOs, the target agent also includes a controller for allocating requests to each of the internal FIFOs, and wherein the target IP agent couples between the target IP core and the interconnect.

5. The interconnect of claim 1, wherein the tag and thread logic comprises both a target agent and a portion of a memory scheduler coupled to the target memory core, and wherein the memory scheduler is configured to be capable of sending QoS latency sensitive traffic on separate thread identifications.

6. The interconnect of claim 1, further comprising
a command buffer pool configured for in-order allocation and out-of order de-allocation, the command buffer pool is configured for multiple de-queues in a same cycle, wherein the command buffer pool has a set of internal FIFO buffers that are dynamically assignable storage buffers to handle the tag parallelism, and logic for allocating requests to each of the internal FIFO buffers, the integrated circuit further comprising logic that locks an allocation of the internal FIFO buffers to be used by request with a given tag identification during a period of time such that the dynamically assignable storage buffers are locked by the logic to a single thread when assigned to a specific tag of a thread but over time during an operation of the integrated circuit, the logic assigns a given buffer between a set of tag IDs making up a given thread.

7. The interconnect of claim 1, wherein the tag and thread logic comprises a two hierarchical level arbiter, wherein a first level arbitrates tags within a thread, and a second level arbitrates threads to concurrently manage tags and threads across multiple memories and wherein the tag and thread logic for the two hierarchical level arbiter is configured to allow for re-arranging to a servicing order of stored requests associated with a given thread with the same or different tag identifications to increase memory access efficiency and account for Quality of Service latency requirements associated with a given request.

8. The interconnect of claim 1, further comprising
a command buffer pool with asynchronous crossing capability configured such that a clock domain logic uses an existing bit field in a request for tag identifications and thread identifications for the purposes of synchronizing the clock domains, such that a clock domain logic uses an existing bit field in a request for tag identifications and thread identifications for the purposes of synchronizing the clock domains between a bus interconnect clock domain and a memory scheduler clock domain.

9. The interconnect of claim 1, further comprising
an address overlap checking circuit configured for checking address overlap between requests, and forcing order when there is an address overlap, wherein the address overlap checking circuit enforces a servicing order between requests of separate tag identifications of a thread.

10. A non-transitory machine-readable storage medium that stores instructions, which when executed by a machine, causes the machine to generate model representations for the interconnect of the integrated circuit of claim 1, which are used in an Electronic Design Automation process.

11. The interconnect of claim 1, further comprising
a multi bit starvation counter for an internal FIFO configured such that every cycle, the starvation counter is decremented by 1 when a corresponding internal FIFO has a read or write request in a register and the internal FIFO is not a winner of the tag arbiter, and wherein, when a starvation counter value reaches zero, it is not decremented further, the read or the write request in the register is performed, and when a last sub-burst of a system request has been scheduled from the internal FIFO, the starvation counter is reset to its programmed value.

12. The interconnect of claim 1, wherein the target memory core comprises a Dynamic Random Access Memory (DRAM) and an algorithm to prioritize the memory accesses based on whether the access is a page hit, matches a current memory bus direction read or write alignment of the memory bus, and whether a same memory chip of the DRAM memory IP core is being accessed.

13. An interconnect for an integrated circuit comprising:
where the interconnect is to communicate transactions between one or more initiator Intellectual Property (IP) cores and one or more target IP cores, including a target memory core, which are coupled to the interconnect;
a tag and thread logic configured to concurrently perform per-thread and per-tag memory access scheduling within a thread and across multiple threads such that the tag and thread logic manages tags and threads to allow for per-tag and per-thread scheduling of memory accesses requests from the initiator IP core out of order from an initial issue order of the memory accesses requests from the initiator IP core, where a tag-arbiter per thread is implemented to handle tag parallelism to arbitrate between tagged requests of the same thread to determine an order in which requests in that thread are scheduled for memory accesses;
an address content locking logic configured to transmit a read request for either a tag identification or thread identification that locks a memory address until a new clearing write request is transmitted from the initiator and received by the locking logic; and
a logic and an associated crossover queue configured to perform a series of requests in order by marking data to ensure that service ordering restrictions are observed across these two or more different request tag identifications and wherein the crossover queue stores the thread identification, the tag identification, and an indication that the request that was issued was issued with an ordering restriction.

14. A method of concurrently performing per-thread and per-tag memory access scheduling comprising:
applying an efficiency algorithm to determine when a first memory operation can be performed in fewer clock cycles than a second memory operation;
applying a latency and efficiency algorithm to determine a latency between a start of each memory operation and completion of each memory operation;
optimize an order of the first memory operation and the second memory operation based on overall memory efficiency accesses and per-thread Quality-of-Service latency requirements;
re-ordering a servicing order of the first memory operation and the second memory operation based on an optimization such that requested memory operations are performed out of an issue order, which can be based on a per-thread and per-tag memory access scheduling within a thread and across multiple threads based on a tag and thread of the first memory operation and a tag and thread of the second memory operation; and
wherein the method is performed by executing instructions on an initiator, such that a tag and thread logic within a system including the initiator concurrently performs the per-thread and per-tag memory access scheduling within a thread and across the multiple threads such that the tag and thread logic in order to concurrently manage servicing of the tags and threads to allow for per-tag and per-thread scheduling of memory accesses out of an initial issue order, and arbitrating amongst tagged requests within the same thread, including tag level parallelism, to determine a scheduled order of memory accesses for that thread in order to concurrently perform per-thread as well as per-tag memory access scheduling 1) within a same thread as well as 2) across two or more separate threads.

15. The method of claim 14, further comprising sending the first memory operation, assigned with a thread identification and a tag identification, to be serviced by a downstream memory and wherein memory operations coming into the tag and thread logic are first separated into per-thread requests and then per tag requests within each thread, such that the tag and thread logic may use the tag parallelism within these threads to optimize overall memory efficiency accesses.

16. The method of claim 15, further comprising using a two hierarchical level arbiter, wherein a first level arbitrates tags within a thread, and a second level arbitrates threads to concurrently manage tags and threads across multiple memories and wherein logic in the arbiters allows for re-arranging to a servicing order of stored requests associated with a given thread with the same or different tag IDs to increase the memory efficiency accesses and account for the Quality of Service latency requirements associated with a given request.

17. An Integrated Circuit, comprising:
multiple initiator Intellectual Property (I/P) cores;
multiple target IP cores including one or more memory IP cores;
an interconnect to communicate transactions between the multiple initiator IP cores and the multiple target IP cores coupled to the interconnect; and a first target IP core, including a memory, coupled through the interconnect to at least a first target IP initiator IP core;
a tag and thread logic configured to concurrently perform per-thread and per-tag memory access scheduling within a thread and across multiple threads such that the tag and thread logic manages tags and threads to allow for the per-tag and per-thread scheduling of memory accesses out of an initial issue order, wherein the tag and thread logic is located within one of the following: within a memory scheduler, within a target agent, or found in a portion of both;

wherein the multiple initiator IP cores, the multiple target IP cores, the interconnect, and the tag and thread logic comprise a System on a Chip;

wherein the tag and thread logic is configured to handle servicing of the tags and the threads concurrently by applying an efficiency and latency algorithm to optimize decisions based on overall memory efficiency accesses and per-thread Quality-of-Service latency requirements to re-order a servicing order of per-tag requests within a same thread out of an issue order, and wherein the tag and thread logic is configured to send a request transaction assigned with thread identifications and tag identifications to be serviced by a downstream memory, and wherein request transactions coming into the tag and thread logic are first separated into per-thread requests, and then per tag requests within each thread such that the tag and thread logic uses tag level parallelism within these threads to optimize the overall memory efficiency accesses, where a tag-arbiter per thread is implemented to handle the tag parallelism to arbitrate between tagged requests of the same thread to determine an order in which requests in that thread are scheduled for memory accesses.

18. A non-transitory machine-readable storage medium that stores instructions, which when executed by a machine, causes the machine to generate model representations for the integrated circuit of claim 17, which are used in an Electronic Design Automation process.

19. The Integrated Circuit of claim 17, wherein the tag and thread logic is located as a portion of a memory scheduler coupled to the memory and the memory scheduler is integrated into a tag based memory scheduler, and wherein the memory is a DRAM and an algorithm to prioritize memory accesses based on whether the access is a page hit, matches a current memory bus direction read or write alignment of the memory bus, and whether a same memory chip of the DRAM memory IP core is being accessed.

* * * * *